`US010819143B1`

United States Patent
Hsiang (10) Patent No.: US 10,819,143 B1
(45) Date of Patent: Oct. 27, 2020

(54) REDUNDANT POWER SUPPLY DEVICE AND REDUNDANT POWER SUPPLY DEVICE PROTECTION CONTROL METHOD

(71) Applicant: ACBEL POLYTECH INC., New Taipei (TW)

(72) Inventor: Chia-Chih Hsiang, New Taipei (TW)

(73) Assignee: ACBEL POLYTECH INC., New Taipei (TW)

( * ) Notice: Subject to any disclaimer, the term of this patent is extended or adjusted under 35 U.S.C. 154(b) by 0 days.

(21) Appl. No.: 16/597,253

(22) Filed: Oct. 9, 2019

(51) Int. Cl.
*H02J 9/06* (2006.01)
(52) U.S. Cl.
CPC ................... *H02J 9/061* (2013.01)
(58) Field of Classification Search
CPC ........................................ H02J 9/061
USPC .......................................... 307/64
See application file for complete search history.

(56) References Cited

U.S. PATENT DOCUMENTS

| 6,507,507 B2 * | 1/2003 | Tokunaga | H02M 1/4208 363/89 |
| 2015/0069842 A1 * | 3/2015 | Niu | G05F 1/563 307/64 |

* cited by examiner

*Primary Examiner* — Joseph Chang
(74) *Attorney, Agent, or Firm* — Muncy, Geissler, Olds & Lowe, P.C.

(57) ABSTRACT

The redundant power supply device includes a power output port, a converter, a comparator unit and an output protection switch. The output protection switch is electrically connected between an output terminal of the converter and the power output port, and the comparator unit compares the voltage across the output protection switch and controls the output protection switch accordingly. The redundant power supply device has a control module that performs a protection control method. When the voltage of the power output port is higher than a preset voltage value and the output current is lower than a preset current value, the control module outputs a short turn-off signal to the enable terminal of the comparator unit, preventing the comparator unit from failing to perform the output protection as designed due to external abnormal slow rising voltage, and ensuring the redundant power supply unit operates normally.

12 Claims, 8 Drawing Sheets

REDUNDANT POWER SUPPLY DEVICE AND REDUNDANT POWER SUPPLY DEVICE PROTECTION CONTROL METHOD

BACKGROUND OF THE INVENTION

1. Field of the Invention

The present invention relates to a power supply device and a control method, and more particularly to a redundant power supply device and a protection control method thereof.

2. Description of the Related Art

A redundant power supply system of the prior art includes a plurality of power supply units and a load, and the power supply units are connected in parallel to simultaneously output power to the load, so that the loading is distributed evenly. The power supply unit with such parallel providing and hot plugging feature will turn off an Oring output protection switch to cut off the system from the power supply unit when the power supply unit is in an abnormal state, while the other power supply units will increase the output power to maintain the required power supply to the load.

Figure 7:
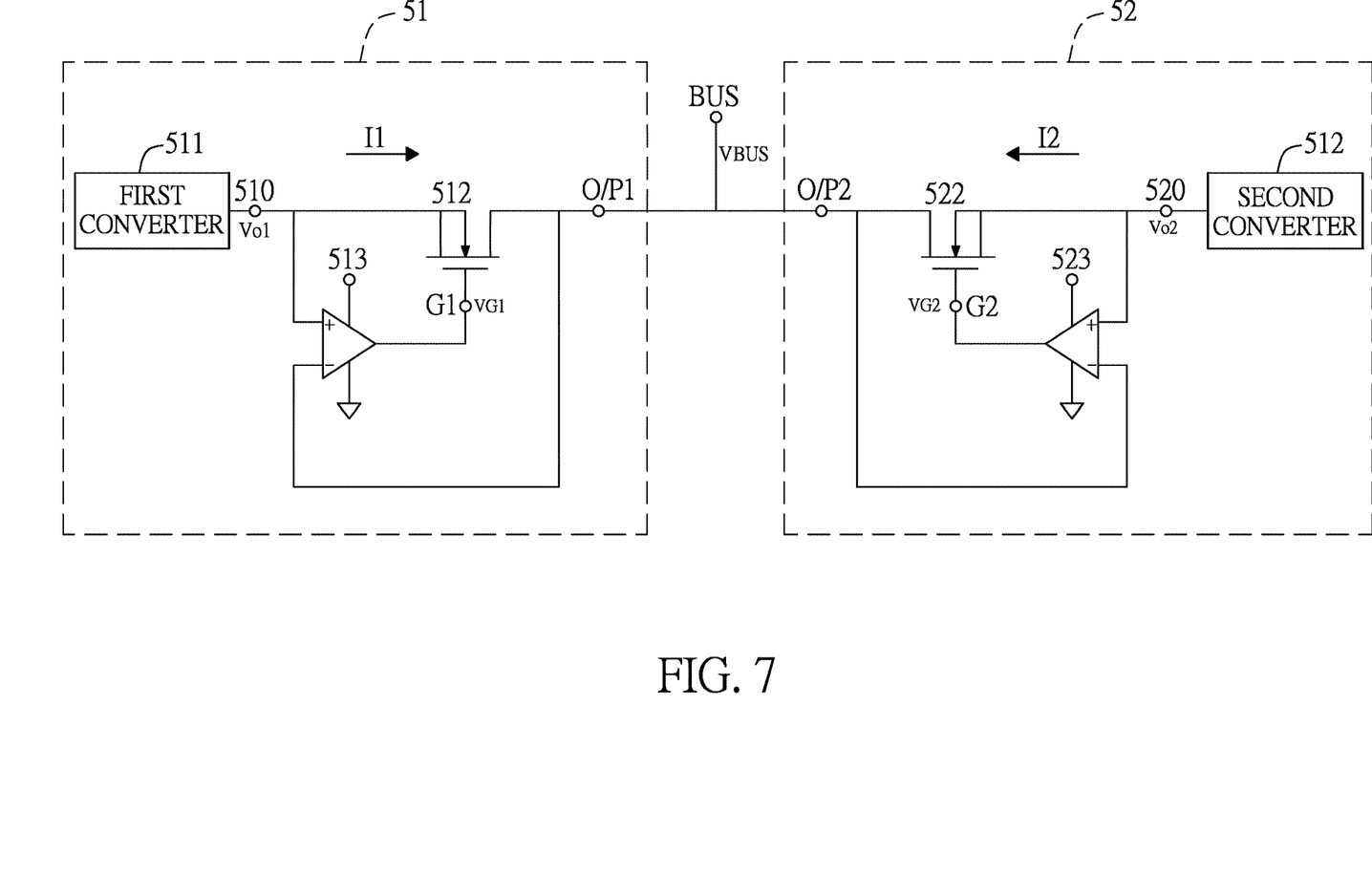
FIG. 7 is a circuit diagram of a conventional redundant power supply system.

Referring to FIG. 7, a redundant power supply system includes a first power supply unit 51 and a second power supply unit 52. The first power supply unit 51 has a first output port O/P1, and includes a first converter 511, a first output protection switch 512 and a first comparator 513. A terminal of the first output protection switch 512 is electrically connected to the first output port O/P1, and an opposite terminal of the first output protection switch 512 is electrically connected to the first output terminal 510 of the first converter 511.

The first comparator 513 compares the voltage of the first output terminal 51 and the voltage of the first output port O/P1. That is, the first comparator 513 compares the voltage across the first output protection switch 512. When the voltage of the first output port O/P1 is higher than the voltage of the first output terminal 510, the current may be flowing from the first output port O/P1 into the first power supply unit 51. Therefore, the first comparator 513 outputs a turn-off signal to a control terminal G1 of the first output protection switch 51 to turn off the first output protection switch 512 for the purpose of protecting the first power supply unit 51. Similarly, the second power supply unit 52 has a second output port O/P2, and includes a second converter 521, a second output protection switch 522, and a second comparator 523. A terminal of the second output protection switch 512 is electrically connected to the second output port O/P2, and an opposite terminal of the second output protection switch 522 is electrically connected to the second output terminal 520 of the first converter 521. The connection and operation manner of the second power supply unit 52 is similar to that of the first power supply unit 51, and details are not described herein. The first output port O/P1 of the first power supply unit 51 and the second output port O/P2 of the second power supply unit 52 are both connected to an output bus, and the power from the two power supply units is provided to a load through the output bus.

Figure 8:
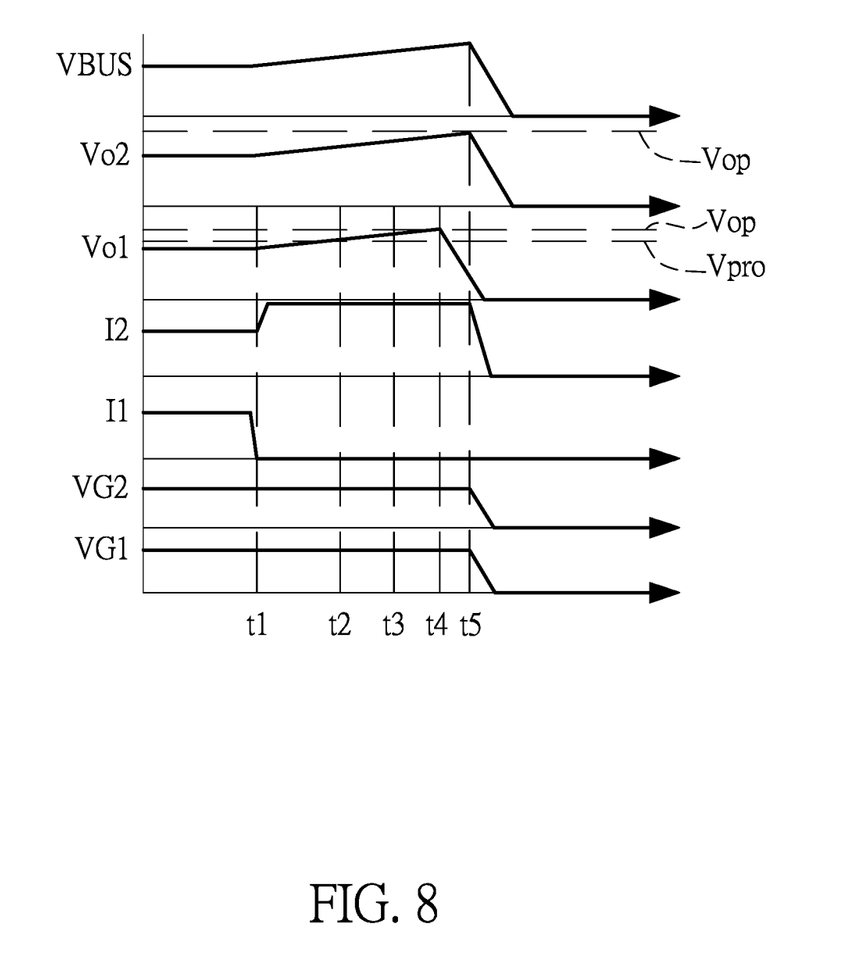
FIG. 8 is a schematic diagram showing the waveforms of the state of use of the conventional redundant power supply system.

Referring to FIG. 7 and FIG. 8, a first output voltage Vo1 is the output voltage of the output terminal 510 of the first converter 511, and a second output voltage Vo2 is the output voltage of the second output terminal 520 of the second converter 521. A first output current I1 and a second output current I2 are the output currents of the first output port O/P1 and the second output port O/P2. A first control terminal voltage VG1 is the control terminal voltage of the first output protection switch 512, and a second control terminal voltage VG2 is the control terminal voltage of the second output protection switch 522.

When the internal components of one of the power supply units is aged, for example, the components of the feedback module of the second converter 521 are aged, the output voltage from the second power supply unit 52 might rise slowly. If the load is extremely light or zero, at a time point t1, when the second output voltage Vo2 of the second converter 521 starts to rise beyond a regular voltage, the first power supply 51 will stop outputting current because the voltage on the output bus is made higher than the first output voltage Vo1 of the first converter 511. Since the load is extremely light, the output current of the second power supply unit 52 is also extremely low, and the current flowing back to the first power supply unit 51 through the first output protection switch 512 is also extremely low. Since the voltage of the second output terminal 520 of the second converter 521 rises slowly, the voltage across the first output protection switch 512 approaches zero, and the first comparator 513 of the first power supply unit 51 cannot detect the voltage drop across the first output protection switch 512. Therefore, the first comparator 513 does not output a turn-off signal to the control terminal of the first output protection switch 512. The first output protection switch 513 maintains at the on state, and the first output voltage Vo1 of the second converter 521 is equal to the second output voltage Vo2 of the second converter 521, which is rising slowly. Furthermore, at the time point t4, the second output voltage Vo2 of the second converter 521 continues to rise to an overvoltage protection threshold of the first power supply unit 51, the overvoltage protection of the first power supply unit 51 is triggered, the first power supply unit 51 stops working, and the first output voltage Vo1 is reduced to 0; at the time point t5, the second output voltage Vo2 of the second electric converter 521 further rises to its own overvoltage protection threshold, and the second power supply unit 52 also stops working. At the time, the situation is that both the first power supply unit 51 and the second power supply unit 52 stop working, and the load cannot obtain any power input from the output bus. The redundant power supply system is completely down and loses its utility.

In short, in the case where the load of a redundant power supply system is extremely light and the output voltage of an abnormal power supply unit rises very slowly, it may eventually lead to the shut-down of both the abnormal power supply unit and the power supply unit that is actually operating normally, and the redundant power supply system stops outputting energy at all, which in turn causes the redundant power supply system to lose its overall function. Therefore, the redundant power supply system of the prior art has to be further improved.

SUMMARY OF THE INVENTION

In order to solve the above problems, the main purpose of the present invention is to provide a redundant power supply device, which can prevent a total system shutdown caused by abnormal increase in output voltage of one of the abnormal power supply devices.

For achieving the foregoing objective, the redundant power supply device includes a power output port, a converter, a comparator unit, an output protection switch, and a control module. The converter has an output terminal, and the output protection switch has a first terminal, a second terminal and a control terminal. The first terminal is electrically connected to the output terminal of the converter, and the second terminal is electrically connected to the power output port. The comparator unit has a positive input terminal, a negative input terminal, an enable terminal and a comparator output terminal. The positive input terminal is electrically connected to the output terminal of the converter, the negative input terminal is electrically connected to the power output port, and the comparator output terminal is electrically connected to the control terminal of the output protection switch. The control module is electrically connected to the power output port and the enable terminal of the comparator unit. When the voltage of the power output port is higher than a preset voltage value and an output current outputted by the power output port is lower than a preset current value, the control module outputs a short turn-off signal to the enable terminal of the comparator unit.

In a redundant power supply system, two or more of the aforementioned redundant power supply devices are connected in parallel. If one of the redundant power supply devices is abnormal and its output voltage is rising slowly, the other normal redundant power supply device can react instantly according to the fact that the output current drops and the output port voltage rises, and the output protection switch is turned off briefly, so that the overvoltage protection of the normal power supply device is not triggered by the external abnormal voltage. After the control module outputs a short-off signal to the enable terminal of the comparator unit, the comparator unit continues to operate normally, and the output protection switch is continuously turned off according to the high output voltage and the lower internal output terminal voltage. Furthermore, when the abnormal redundant power supply device triggers its own overvoltage protection mechanism and shutdown, the voltage of the power output port drops, and the comparator unit of the normal redundant power supply device turns on the output protection switch accordingly, so that the normal redundant power supply device continues to provide the power supply of the load. As a result, it is avoided that the load cannot receive any power output when one of the redundant power supply devices is actually functioning well, and therefore ensures the function of the redundant power supply system is stable and effective.

Another object of the present invention is to provide a redundant power supply device protection control method that ensures system stability.

In order to achieve the aforementioned technical means, the aforementioned method comprises the following steps:

detecting a voltage of a power output port;

detecting an output current of the power output port;

determining whether the voltage of the power output port is higher than a preset voltage value, and determining whether the output current is lower than a preset current value;

when the voltage of the power output port is higher than the preset voltage value and the output current is less than the preset current value, outputting a short turn-off signal to an output protection switch.

When the voltage of the power output port of the redundant power supply device is higher than the preset voltage value and the output current is lower than the preset current value, it indicates that the voltage of the power output port is higher than the rated voltage and the high voltage is not outputted from the redundant power supply device itself, but from another redundant power supply device which is parallel connected. Therefore, a short output signal is outputted to the output protection switch. When the output protection switch is temporarily turned off and forms an open circuit, the redundant power supply device no longer receives an abnormally high voltage from the outside, such that a voltage difference across the output protection switch is formed. The voltage difference across the output protection switch triggers the output protection mechanism of the redundant power supply device to turn off the output protection switch actively, prevents the abnormal high voltage from the other redundant power supply device from triggering its own overvoltage protection mechanism, and therefore prevents the well-functioning redundant power supply device from being shut down by a high voltage from the outside. Since the well-functioning power supply device is still operating normally, when the external abnormal high voltage drops, the power supply device continues outputting power by turning on the output protection switch again, and ensures the well-functioning of the entire redundant power supply system.

DETAILED DESCRIPTION OF THE INVENTION

Figure 1:
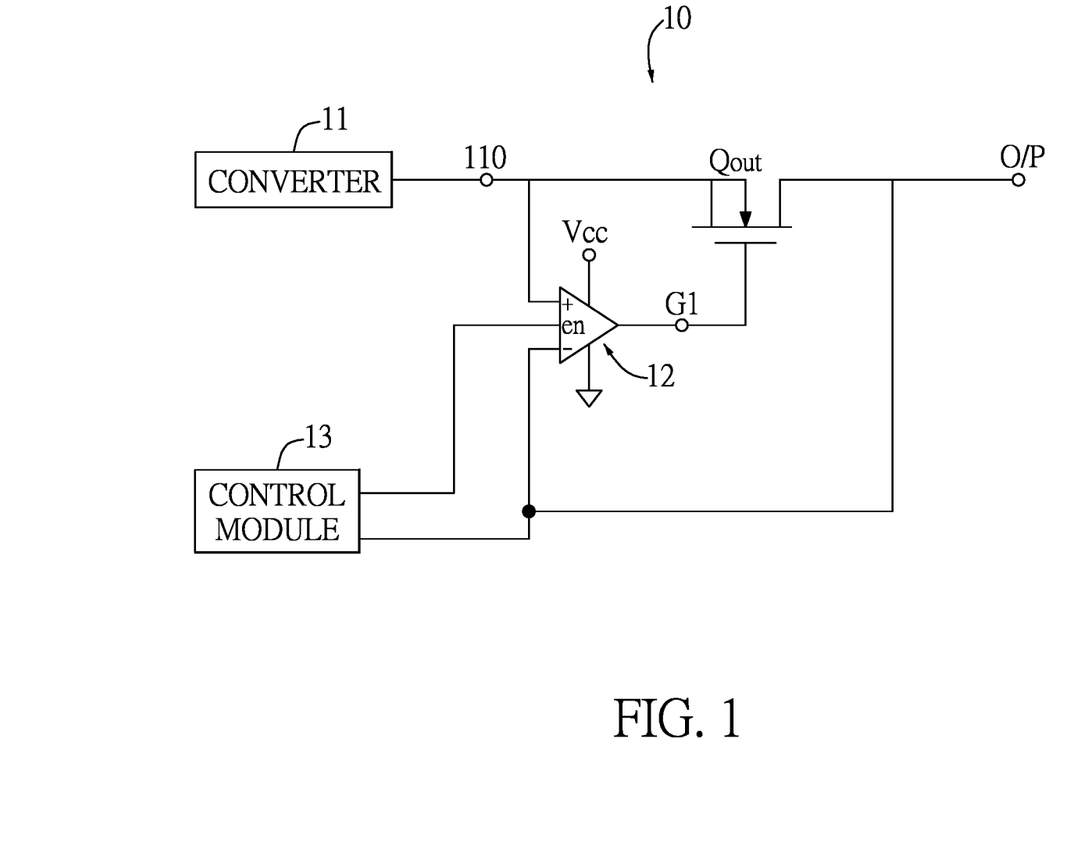
FIG. 1 is a circuit diagram of a redundant power supply device of the present invention.

With reference to FIG. 1, a redundant power supply device 10 of the present invention includes a power output port O/P, a converter 11, an output protection switch Qout, a comparator unit 12, and a control module 13. The converter 11 has an output terminal 110, and the converter 11 is configured to convert an input voltage and output a converted voltage. The output protection switch Qout has a first terminal, a second terminal, and a control terminal G1. The first terminal is electrically connected to the output terminal 110 of the converter 11, and the second terminal is electrically connected to the power output port O/P, so that the output terminal 110 of the converter 11 is electrically connected to the power output port O/P through the output protection switch Qout to output power. The comparator unit 12 has a positive input terminal, a negative input terminal, an enable terminal, and a comparator output terminal. The positive input terminal is electrically connected to the power output port O/P, the negative input terminal is electrically connected to the output terminal 110 of the converter 11, and the comparator output terminal is electrically connected to the control terminal G1 of the output protection switch Qout. The control module 13 is electrically connected to the power output port O/P and the enable terminal of the comparator unit 12. When the voltage of the power output port O/P is higher than a preset voltage value and the output current outputted by the power output port O/P is lower than a preset current value, the control module 13 outputs a short turn-off signal to the enable terminal of the comparator unit 12.

Preferably, the preset voltage value is higher than a rated output voltage of the redundant power supply device 10, but lower than an overvoltage protection threshold of the redundant power supply device 10. Therefore, the judgment condition of the control module 13 is satisfied before the voltage of the power output port O/P is raised to the overvoltage protection threshold, and the overvoltage protection mechanism of the well-functioning redundant power supply device 10 is prevented from being triggered.

In addition, the preset current value is preferably set according to a withstand current of the parasitic diode of the output protection switch Qout, so that the output protection switch Qout will not collapse or be damaged when it is turned off by the comparator unit 12.

The operation of the redundant power supply device 10 of the present invention will be further described in detail below. A redundant power supply system having two sets of redundant power supply devices will be taken as an example to illustrate the effects achieved by the present invention.

Figure 2:
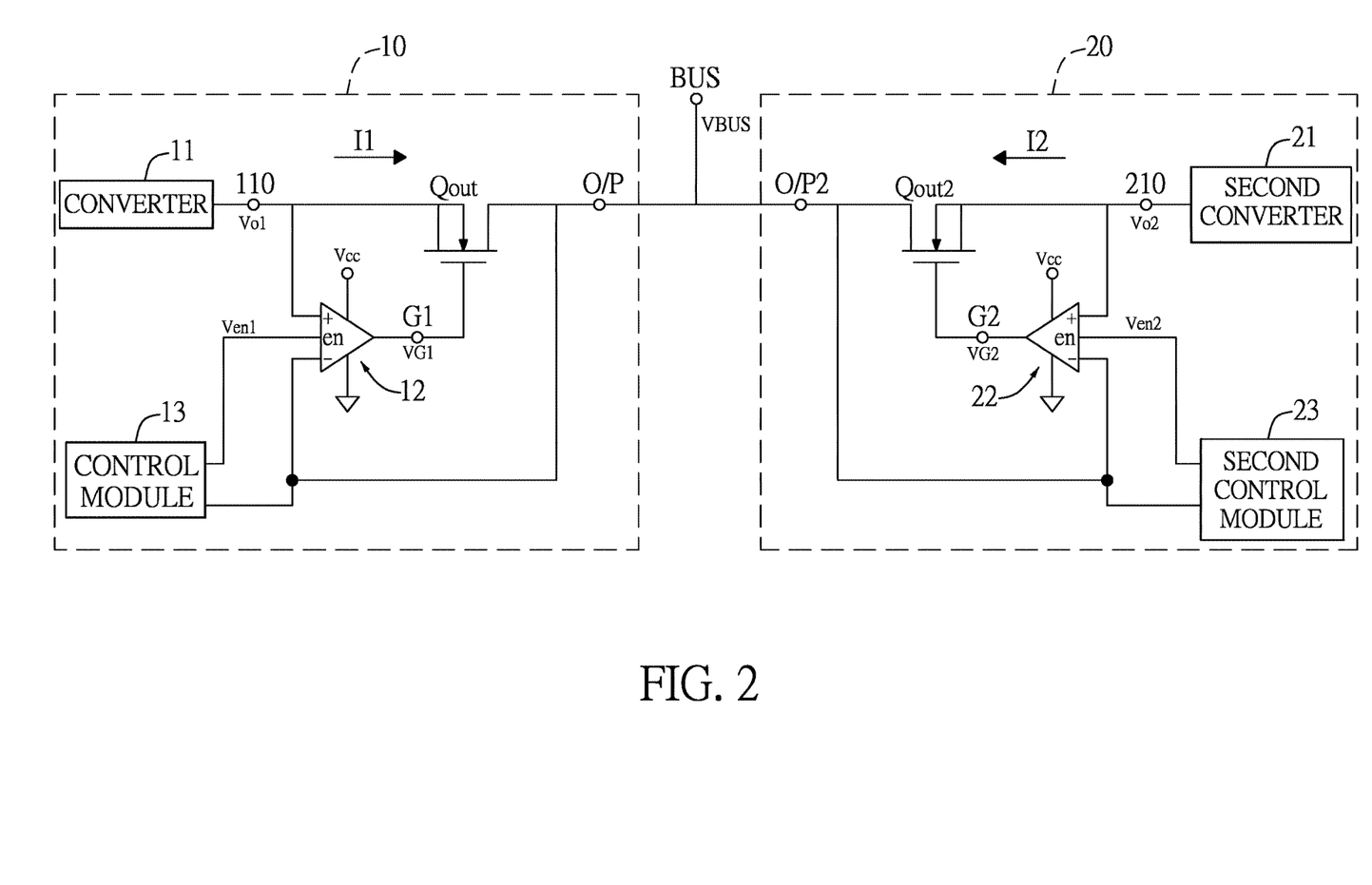
FIG. 2 is a circuit diagram of a redundant power supply system to which the redundant power supply device of the present invention is applied.

FIG. 2 is a schematic diagram of a redundant power supply system, including the redundant power supply device 10 and a second redundant power supply device 20. The second redundant power supply device 20 includes a second power output port O/P2, a second converter 21, a second output protection switch Qout2, a second comparator unit 11, and a second control module 23. The architecture of the second redundant power supply device 20 is the same as that of the redundant power supply device 10, as illustrated in FIG. 2. The connection between components is not described in detailed hereinafter. In the redundant power supply system, the redundant power supply device 10 and the second redundant power supply device 20 are electrically connected to an output bus BUS, and the power is supplied to a load through the output bus BUS.

In the example, it is assumed that the redundant power supply device 10 is operating normally, and the output voltage of second redundant power supply device 20 rises slowly due to component aging.

Figure 3:
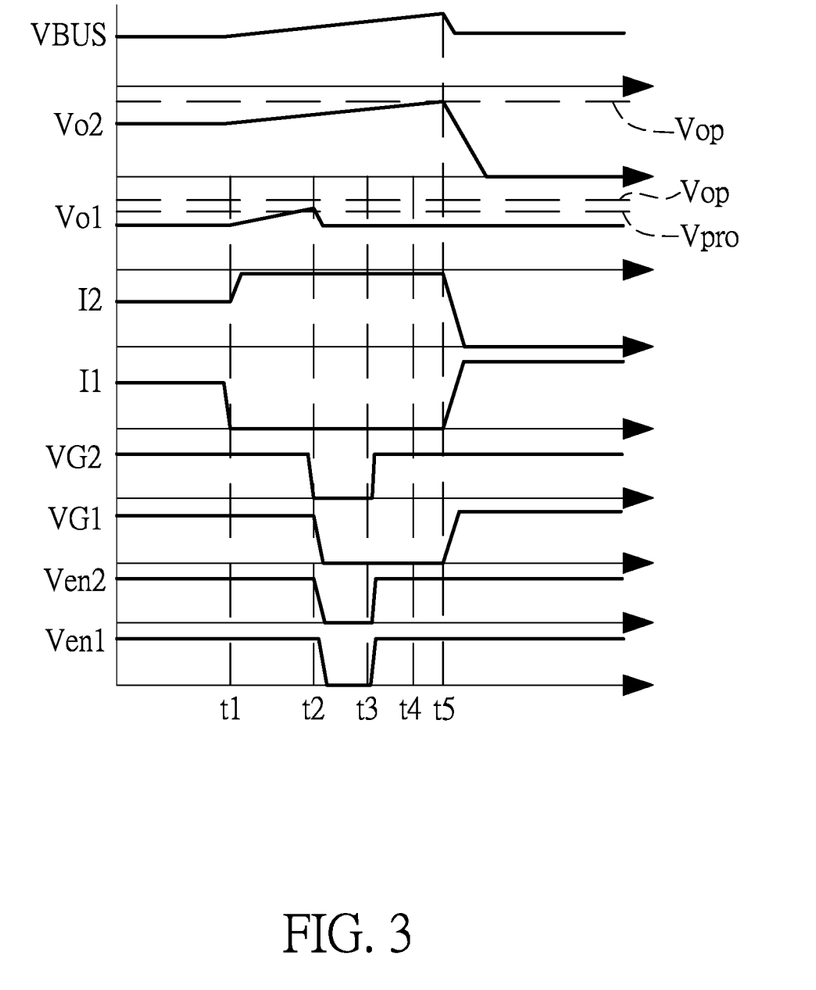
FIG. 3 is a waveform diagram showing the state of use of a redundant power supply system to which the redundant power supply device of the present invention is applied.

FIG. 3 is a voltage and current waveform diagram of a plurality of related nodes in the redundant power supply system. Wherein, VBUS is the voltage of the output bus BUS, the power output port O/P and the second power output port O/P2. Vo1 is the voltage of the output terminal 110 of the converter 11, and Vo2 is the voltage of the second output terminal 210 of the second converter 21. I1 is the output current from the power output port O/P. I2 is the output current from the second power output port O/P2. VG1 is the voltage of the control terminal G1 of the output protection switch Qout, and VG2 is the voltage of the second control terminal G2 of the second output protection switch Qout2. Ven1 is the voltage of the enable terminal of the comparator unit 12, and Ven2 is the voltage of the enable terminal of the second comparator unit 12.

The state of the voltage and current at each point in the redundant power supply system at different time points will be described below.

$0<T<t1$: The redundant power supply device 10 and the second redundant power supply device 20 are both operating normally, the output terminal 110 voltage Vo1 of the converter 11 and the output terminal 210 voltage Vo2 voltage of the second converter 21 are equal, and the first output current I1 and the second output current I2 are also equal.

$T1<T<t2$: the output terminal voltage Vo2 of the second converter 21 starts to rise slowly due to an abnormal condition, and when the output terminal voltage Vo2 of the second converter 21 rises to be slightly higher than the output terminal voltage Vo1 of the converter 11, the redundant power supply device 10 can no longer output current, and the output current I1 is reduced to 0. At this point, the current outputted from the output bus BUS to the load is completely provided by the second redundant power supply device 20. Since no current is passing through the output protection switch Qout at this point, the output terminal voltage Vo1 of the converter 11 is equal to the output terminal voltage Vo2 of the second converter 21, and the output terminal voltage Vo1 rises slowly with the output terminal voltage Vo2 of the second converter 21.

$T=t2$: The output terminal voltage Vo1 of the converter 11 reaches the preset voltage value VPRO, and the output current I1 of the power output port O/P approximates 0, and therefore is lower than the preset current value.

$T2<T<t3$: The control module 13 outputs a short turn-off signal to the enable terminal of the comparator unit 12, as shown by the enable terminal voltage Ven1 waveform. Because the enable terminal of the comparator unit 12 receives the turn-off signal, the comparator output terminal of the comparator unit 12 also outputs a low-voltage turn-off signal, which is received by the control terminal G1 of the output protection switch Qout. When the output protection switch Qout is cut off, the output terminal voltage Vo1 of the converter 11 is no longer affected by the output voltage Vo2 of the second redundant power supply device 20, and the output terminal voltage Vo1 of the converter 11 returns to the normal output voltage of the converter 11.

$T3<T<t4$: The short turn-off signal of the enable terminal of the comparator unit 12 ends, and the control module 13 outputs an enable signal to the enable terminal of the comparator unit 12. Since the output protection switch is turned off, the voltage of the power output port O/P equals to that of the output bus VBUS, which is the output terminal voltage Vo2 of the abnormal second converter 21. The comparator unit 12 continues to output a turn-off signal to the control terminal G1 of the output protection switch Qout according to the fact that the power output port O/P voltage is higher than the output voltage Vo2 of the converter 11, as shown by the VG1 waveform in FIG. 3.

$T=t5$: the output voltage Vo2 of the second converter 211 reaches the overvoltage protection threshold Vop, the second redundant power supply device 20 is turned off, the second redundant power supply device 20 no longer outputs current and voltage, and the output bus voltage VBUS falls. When the output bus voltage VBUS along with the output port O/P voltage is lower than the output terminal voltage Vo1 of the converter 11, the comparator unit 12 outputs a turn-on signal to the control terminal G1 of the output protection switch Qout. The output protection switch Qout is turned on, and the redundant power supply device 10 continues to output power to the output bus BUS and replace the second redundant power supply device 20, which is turned off due to the overvoltage.

In summary, when one of the redundant power supply devices causes the output voltage to rise slowly due to an internal abnormal situation, such that the other normal redundant power supply device cannot output current and fails to turn off the output protection switch Qout, the control module 13 outputs the short turn-off signal to the enable terminal of the comparator unit 12, which actively triggers the cutoff of the output protection switch Qout. As a result, when the output voltage of the abnormal second redundant power supply device 20 and the output bus voltage VBUS rise to the overvoltage protection threshold, the normal redundant power supply device 10 is able to turn on the output protection switch Qout again, and maintains the power provided to the load through the output bus BUS. Therefore, as shown by the output bus voltage VBUS in FIG. 3A, the output bus BUS maintains the power output, preventing the power supply of the load from being interrupted.

Figure 4:
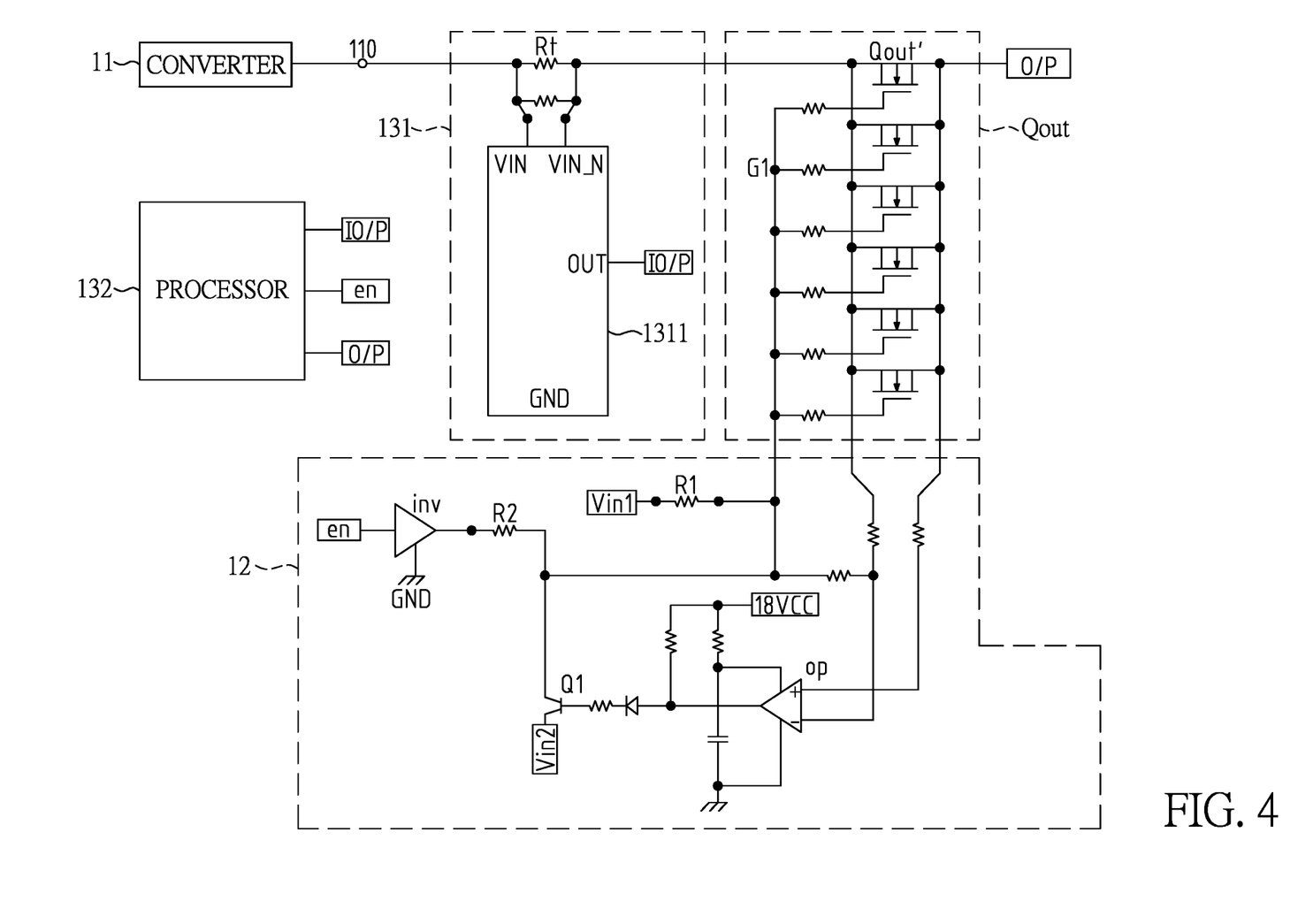
FIG. 4 is a circuit diagram of a first embodiment of a redundant power supply device of the present invention.

FIG. 4 is a circuit diagram of a preferred embodiment of a redundant power supply device of the present invention. The control module 13 includes a current detection unit 131 and a processor 132. The current detection unit 131 is electrically connected between the output terminal 110 of the converter 11 and the power output port O/P. The current detection unit 131 detects the current flowing to the first terminal of the output protection switch Qout and generates a current sensing signal. The processor 132 is electrically connected to the enable terminal of the comparator unit 12 and the power output port O/P, and is electrically connected to the current detection unit 131 to receive the current sensing signal. The processor 132 determines an output current of the power output port O/P according to the current sensing signal, and determines a voltage of the power output port O/P. If the output current is lower than the preset current value and the voltage of the power output port O/P is higher than the preset voltage value, the processor 132 generates the short turn-off signal and outputs it to the enable terminal of the comparator unit 12.

With reference to FIG. 4, in the embodiment, the output protection switch Qout includes a plurality of parallel switching elements Qout' to reduce the output load and improve the power output efficiency. Preferably, each of the switching elements Qout' is an N-channel metal oxide semiconductor field effect transistor (NMOS) having a drain, a source and a gate. The drain of each switching element Qout' is electrically connected to the first terminal of the output protection switch Qout, the source of each of the switching elements Qout' is electrically connected to the second terminal of the output protection switch Qout, and the gate of each of the switching elements Qout' is electrically connected to the control terminal G1 of the output protection switch Qout. In addition, the current detection unit 131 includes a sensing resistor Rt and a current sensing processor 1311, wherein the output terminal 110 of the converter 11 is electrically connected to the first terminal of the output protection switch Qout through the sensing resistor Rt. The current sensing processor 1311 generates the current sensing signal according to a voltage difference across the sensing resistor Rt.

With reference to FIG. 4, preferably, the comparator unit 12 includes an amplifier OP, an inverter INV, a first switch Q1, a high voltage input terminal Vin1, a low voltage input terminal Vin2, a first resistor R1, and a second resistor R2. The amplifier OP has a first input terminal, a second input terminal, and an output terminal. The first input terminal and the second input terminal of the amplifier OP are electrically connected to the first terminal and the second terminal of the output protection switch Qout. The high voltage input terminal Vin1 is electrically connected to the control terminal G1 of the output protection switch Qout through the first resistor R1. The first switch Q1 is electrically connected between the control terminal G1 and the low voltage input terminal Vin2 of the output protection switch Qout. The output terminal of the amplifier OP is electrically connected to a control terminal of the first switch Q1.

The inverter INV has an input terminal, an enable control terminal, and a ground terminal gnd. The input terminal is the enable terminal of the comparator unit 12, and the enable control terminal is connected to the control terminal G1 of the output protection switch Qout through the second resistor R2. When the input terminal of the inverter INV receives a turn-off signal from the control module 13, the inverter INV makes the enable control terminal and the ground terminal GND electrically conducted, such that the voltage of the control terminal G1 of the output protection switch Qout is a divided voltage of the first voltage resistor R1 and the second resistor R2. Since the divided voltage is lower than the threshold voltage of the output protection switch Qout, the output protection switch Qout is not turned on and still forms an open circuit. If the voltage of the power output port O/P is higher than the output terminal 110 of the converter 11, it indicates that the power output port is receiving an abnormal voltage higher than the rated output voltage. In a regular condition, the amplifier will turn on the first switch Q1, and the first switch should form a shorted path between the control terminal G1 of the output protection switch Qout and the low voltage input terminal Vin2, so that the control terminal G1 of the output protection switch Qout forms an open circuit and ensures the abnormal high voltage received by the power output port O/P would not lead to a current flowing back to the converter 11 and cause internal components damage.

However, in the abnormal situation stated above, that is, the output voltage of another parallel redundant power supply device rises slowly, the voltage of the output bus BUS rises slowly and the normal redundant power supply device cannot output current, the voltage of the normal redundant power supply device output port O/P rises slightly to the rated output voltage. Since there is no current flowing through the output protection switch Qout, or the reverse current flowing from the abnormal redundant power supply device is extremely small, the voltage difference across the output protection switch Qout cannot actually trigger the amplifier OP to turn on the first switch Q1 and turn off the output protection switch Qout. At this time, the processor 132 determines that the voltage of the power output port O/P is higher than the preset voltage value voltage, and determines the output current is lower than the preset current value according to the current sensing signal, so the processor 132 outputs a short turn-off signal to the input terminal of the inverter INV, and the inverter INV lowers the voltage of the control terminal of the output protection switch Qout and the voltage protection switch Qout forms an open circuit. As a result, the voltage difference across the output protection switch Qout is the difference between the power output port voltage and the output terminal voltage of the converter 11.

Further, when the short turn-off signal ends, since the voltage difference across the output protection switch Qout is the voltage difference between the power output port O/P and the output terminal 110 of the converter 11, the amplifier OP makes the first switch Q1 conducted, the control terminal G1 voltage of the output protection switch Qout is equal to the low voltage input terminal Vin2, and the output protection switch Qout continues to be in an open-circuit state until the abnormal redundant power supply device triggers its own overvoltage protection mechanism and is turned off. When the voltage of the output bus BUS and the power output port O/P drops below the output terminal voltage Vo1 of the converter 11 and the amplifier OP turns off the first switch Q1, the output protection switch Qout is turned on, and the normal redundant power supply device continues to supply power to the output bus BUS.

Figure 5:
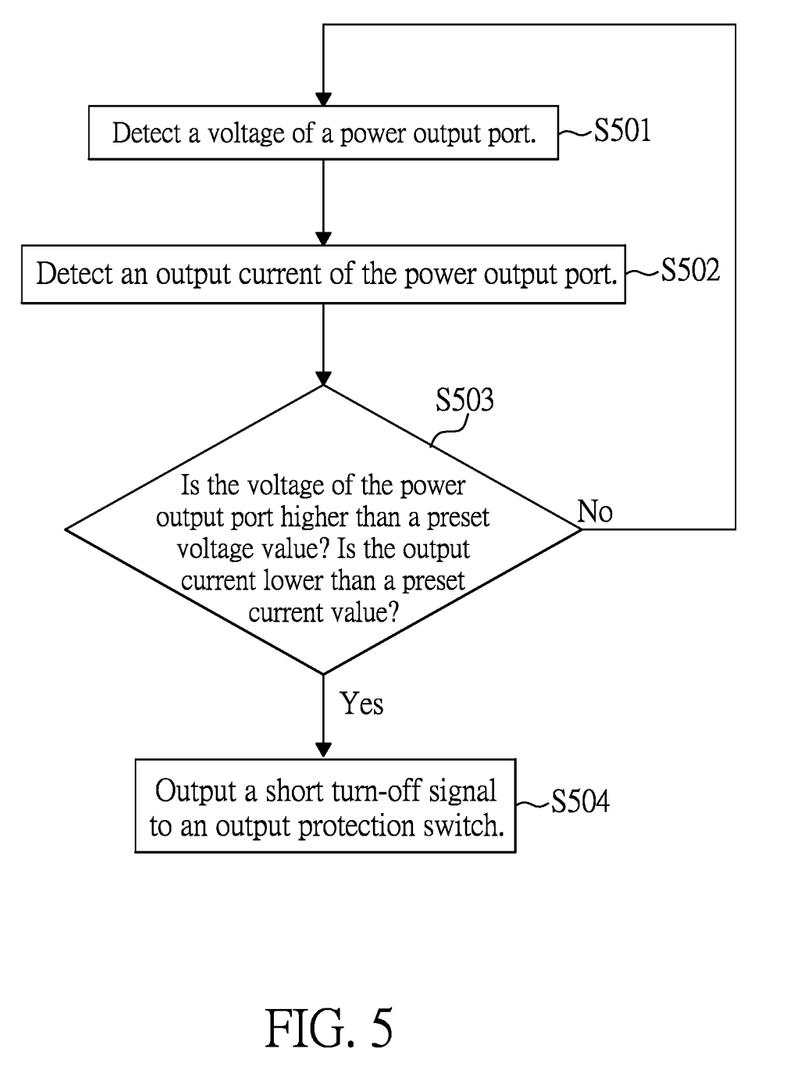
FIG. 5 is a schematic flow chart of an abnormal protection control method for a redundant power supply device according to the present invention.

The present invention further provides a redundant power supply device protection control method, which is implemented by the foregoing redundant power supply device, as shown in FIG. 5, the method including the following steps:

detecting a voltage of a power output port (S501);

detecting an output current of the power output port (S502);

determining whether the voltage of the power output port is higher than a preset voltage value, and determining whether the output current is lower than a preset current value (S503);

when the voltage of the power output port is higher than the preset voltage value and the output current is lower than the preset current value, outputting a short turn-off signal to an output protection switch (S504).

When the load of the redundant power supply device is extremely light or the load approaches 0, the voltage of the power output port O/P is higher than the preset voltage value, and the output current is less than the set current, indicating that the high voltage of the power output port O/P is from the output voltage of another redundant power supply device connected to it. Therefore, the control module outputs a short turn-off signal to the output protection switch Qout for a brief time, and triggers the output protection mechanism. Preferably, the length of the turn-off signal is determined according to the turn-off delay time of the output protection switch Qout. That is, the turn-off signal has to be sufficient for the output protection switch Qout to be turned off to form an open circuit, so that the internal voltage of the redundant power supply device no longer receives an abnormally high voltage from the outside. As long as a voltage difference forms across the output protection switch Qout, the output protection mechanism of the power supply device will be triggered. As a result, when the short turn-off signal ends, the output protection switch Qout remains off due to the output protection mechanism and remains off when another abnormal redundant power supply device still outputs an abnormally high voltage.

Figure 6:
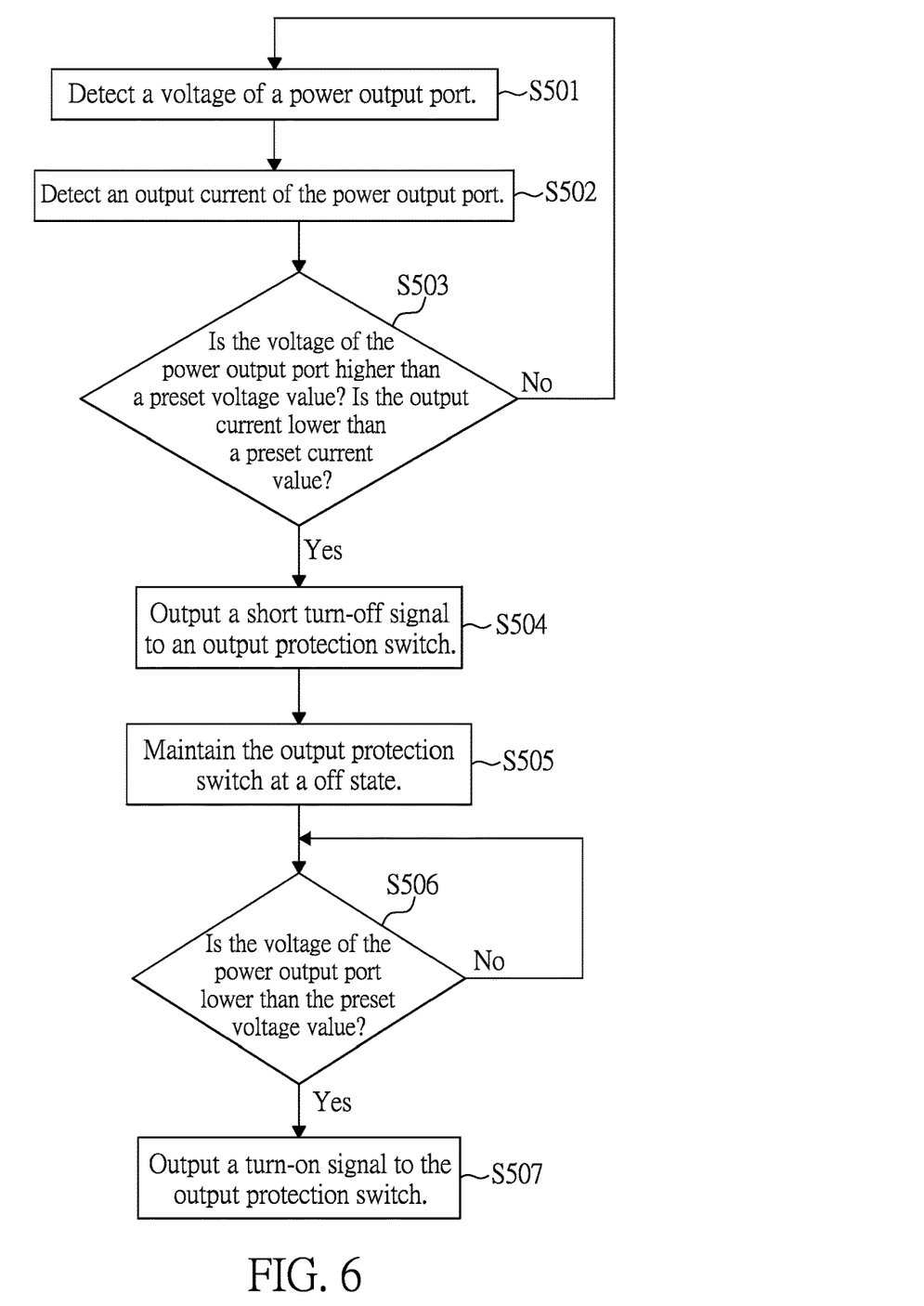
FIG. 6 is a schematic flow chart of a first embodiment of a method for controlling abnormality of a redundant power supply device according to the present invention.

Referring to FIG. 6, the redundant power supply device protection control method further includes the following steps:

after outputting a short turn-off signal to the output protection switch Qout, maintaining the output protection switch at an off state (S505), and determining whether the voltage of the output port is lower than the preset voltage value (S506);

when the voltage of the output port is lower than the preset voltage value, outputting a turn-on signal to the output protection switch (S507).

When the voltage of the power output port O/P falls back below the preset voltage value, the situation may be that the abnormal redundant power supply device shuts down due to its own high output voltage and triggers its own overvoltage protection mechanism, so that the voltage of the output bus drops. As a result, a turn-on signal is outputted to the output protection switch, so that the well-functioning redundant power supply device outputs power to the load through the output bus, thereby maintaining the overall well-functioning of the redundant power supply system and ensures power supply.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A redundant power supply device protection control method comprising the following steps:
    detecting a voltage of a power output port;
    detecting an output current of the power output port;
    determining whether the voltage of the power output port is higher than a preset voltage value, and determining whether the output current is lower than a preset current value;
    when the voltage of the power output port is higher than the preset voltage value and the output current is lower than the preset current value, outputting a short turn-off signal to an output protection switch.

2. The redundant power supply device protection control method as claimed in claim 1, further comprising:
    after outputting the short turn-off signal, maintaining the output protection switch at an off state.

3. The redundant power supply device protection control method as claimed in claim 2, further comprising:
    after outputting the short turn-off signal, further determining whether the voltage of the power output port is lower than the preset voltage value;
    when the voltage of the power output port is lower than the preset voltage value, outputting a turn-on signal to the output protection switch.

4. The redundant power supply device protection control method as claimed in claim 1, wherein the short turn-off signal is only outputted when the load of the redundant power supply device is light or zero.

5. The redundant power supply device protection control method as claimed in claim 1, wherein when the voltage of the power output port is between the preset voltage value and an overvoltage protection voltage value, the voltage of the power output port is higher than the preset voltage value.

6. The redundant power supply device protection control method as claimed in claim 1, wherein when the output current is between 0 and the preset current value, the output current is higher than a preset current value.

7. The redundant power supply device protection control method as claimed in claim 1, wherein the preset current value is set according to a withstand current value of a body diode of the output protection switch.

8. The redundant power supply device protection control method as claimed in claim 1, wherein the length of the short turn-off signal is set according to a turn-off delay time of the output protection switch.

9. A redundant power supply device, comprising:
    a power output port;
    a converter, having an output terminal;
    an output protection switch, having a first terminal, a second terminal, and a control terminal, wherein the first terminal is electrically connected to the output terminal, and the second terminal is electrically connected to the power output port;
    a comparator unit, having a positive input terminal, a negative input terminal, an enable terminal, and a comparator output terminal, wherein the positive input terminal is electrically connected to the output terminal, the negative input terminal is electrically connected to the power output port, and the comparator output terminal is electrically connected to the control terminal of the output protection switch;

a control module, electrically connected to the power output port and the enable terminal, wherein when the voltage of the power output port is higher than a preset voltage value and an output current outputted from the power output port is lower than a preset current value, the control module outputs a short turn-off signal to the control terminal of the output protection switch.

10. The redundant power supply device as claimed in claim 9, wherein the control module comprises:

a current detection unit, electrically connected to the output terminal of the converter and the power output port, wherein the current detection module detects the current flowing from the output terminal of the converter to the power output port and generates a current detection signal;

a processor, electrically connected to the enable terminal of the comparator unit, the current detection unit, and the power output port; wherein the processor determines the value of the output current according to the current detection signal, and when the output current is lower than the preset current value and the voltage of the power output port is higher than the preset voltage value, the processor generates the short turn-off signal.

11. The redundant power supply device as claimed in claim 9, wherein the comparator unit comprises:

an amplifier, having a first input terminal, a second input terminal and an output terminal, wherein the first input terminal is electrically connected to the first terminal of the output protection switch, and the second input terminal is electrically connected to the second terminal of the output protection switch;

a low voltage input terminal;

a first switch, having a control terminal and electrically connected between the control terminal of the output protection switch and the low voltage input terminal, wherein the control terminal of the first switch is electrically connected to the output terminal of the amplifier;

a first resistor;

a high voltage input terminal, electrically connected to the control terminal of the output protection switch through the first resistor; wherein when the voltage of the second input terminal of the amplifier is higher than the first input terminal, the amplifier turns on the first switch.

12. The redundant power supply device as claimed in claim 11, wherein the comparator unit further comprises:

a second resistor;

an inverter, having an input terminal, an enable control terminal and a ground terminal, wherein the input terminal is the enable terminal of the comparator unit, and the enable control terminal is electrically connected to the control terminal of the output protection switch;

when the inverter receives the turn-off signal of the control module from the input terminal, the inverter makes the enable control terminal and the ground terminal electrically conducted.

* * * * *